United States Patent [19]
Fauchard

[11] Patent Number: 4,984,678
[45] Date of Patent: Jan. 15, 1991

[54] DEVICE FOR THE SEPARATION AND ALIGNMENT OF OBJECTS AND A SORTING INSTALLATION FOR USING SAME

[75] Inventor: Pierre Fauchard, Nantes, France

[73] Assignee: Centre National d'Etudes des Telecommunications, Issy-les-Moulineaux, France

[21] Appl. No.: 479,248

[22] Filed: Feb. 13, 1990

[30] Foreign Application Priority Data

Feb. 15, 1989 [FR] France ................................. 89 01981

[51] Int. Cl.⁵ .............................................. B65G 47/12
[52] U.S. Cl. .................................... 198/443; 198/658; 198/396; 193/10
[58] Field of Search .................. 193/10; 198/392, 396, 198/397, 443, 446, 658, 671

[56] References Cited

U.S. PATENT DOCUMENTS

| | | | |
|---|---|---|---|
| 847,451 | 3/1907 | Wilmore | 198/443 X |
| 1,741,014 | 12/1929 | Harrington | 198/658 |
| 2,341,265 | 2/1944 | Crawford | 198/443 |
| 3,133,624 | 5/1964 | Craig | 198/443 |
| 3,297,131 | 1/1967 | Pawlowski | 198/396 X |
| 3,319,825 | 5/1967 | Dore | 198/443 X |
| 3,774,806 | 11/1973 | Swart et al. | 198/397 X |
| 3,815,730 | 6/1974 | Zwiep et al. | 198/397 X |
| 4,274,531 | 6/1981 | Whitmore | 198/397 |
| 4,461,380 | 7/1984 | Grikis | 198/397 X |
| 4,583,635 | 4/1986 | Timmer et al. | 198/443 X |

FOREIGN PATENT DOCUMENTS

| | | | |
|---|---|---|---|
| 0094617 | 11/1983 | European Pat. Off. | 198/397 |
| 2631008 | 11/1989 | France | 198/658 |
| 0038057 | 4/1978 | Japan | 198/397 |
| 1045490 | 10/1966 | United Kingdom | 198/397 |

Primary Examiner—H. Grant Skaggs
Assistant Examiner—James R. Bidwell
Attorney, Agent, or Firm—Pollock, VandeSande & Priddy

[57] ABSTRACT

A device for the separation and alignment of objects of the packages, parcels or similar kind, including a conveyor for the parcels brought in bulk to the inlet and for discharging the same parcels separated and aligned at the outlet, which includes at least one truncated cone opened at its ends, driven continuously in rotation about its axis which is inclined with respect to the horizontal and which includes in its inner surface a set of helical wings, axially offset with respect to one another and extending when taken together over at least one complete turn of the truncated cone, the parcels introduced at the upper end of smaller diameter at the inlet of the truncated cone being discharged at its lower end of larger diameter at its outlet.

14 Claims, 2 Drawing Sheets

DEVICE FOR THE SEPARATION AND ALIGNMENT OF OBJECTS AND A SORTING INSTALLATION FOR USING SAME

The present invention relates to a device for carrying out automatically the separation and setting in alignment in a given preferential direction of objects brought in bulk at the inlet of said device and received separately and aligned at its outlet, for a ulterior treatment.

The invention applies more particularly but not exclusively to the separation of packages or parcels in very large quantities, of variable shapes and sizes, such as those received while moving continuously on a conveyor belt by a sorting or a dispatching center or office, notably of the kind of those used in the General Post Office or mail-order businesses, whereby these parcels have to be later marked with an identification code as a function of their destinations. In such a center or office, the selection of these parcels and notably their ulterior routing to appropriate directions as a function of this code require an accurate identification of said code, and in particular that can be carried out conveniently without any risk of count or reading error, these conditions being ensured if the parcels are previously spaced apart and placed substantially on a continuous line, according which they move in the vicinity of a device which can then read correctly the code carried by each parcel.

The devices presently known for the separation of parcels use either sets of conveyor belts moving at different speeds or vibrating tables fitted out with rotary brushes conveniently oriented, the surface of these belts or tables including generally a coating having a high coefficient of friction so as to better brake and grip the parcels during their movements. But apart from their complexity and the necessity of disposing of a large surface on the ground for mounting such installations, they do not allow solving efficiently the problems met when two parcels arrive superimposed or inclined with respect to their direction of travel, covering each other in part, and possibly altering the reading of the code of one of them, which may be partly or totally hidden by the volume of the other.

Particularly in these installations, the correct position setting rate of the parcels does not generally exceed 80%, and reaches 85% only exceptionally, which is still insufficient for an optimal operation of the installation which should be able to treat the whole of packages or parcels to be sorted out with an efficiency of at least 95%.

By way of indication, conveyor systems of the general type mentioned above are illustrated in U.S. Pat. No. 2,972,433 and in patent application EP-A-0,094,617 although the devices disclosed in these documents aim at different applications, which makes them little adapted or even not adapted to the separation and sorting of parcels or similar objects.

The object of the invention is a device allowing reaching this object with a simple assembly, low cost to manufacture, easy to maintain, and having a space requirement relatively less than that of standard installations, and finally and above all adapted for treating a large volume of various packages or parcels, whatever the weight, shape or nature of their packaging material.

To this effect, the device in consideration, including conveyor means for the parcels brought in bulk to the inlet and for discharging the same parcels separated and aligned at the outlet, is characterized in that it includes at least one truncated cone opened at its ends, driven continuously in rotation about its axis which is inclined with respect to the horizontal and which includes in its inner surface a set of helical wings, axially offset with respect to one another and extending when taken together over at least one complete turn of the truncated cone, the parcels introduced at the upper end of smaller diameter at the inlet of the truncated cone being discharged at its lower end of larger diameter at its outlet.

According to another particularly advantageous feature for using the device, the inner surface of the truncated cone includes a coating with a very low coefficient of friction, notably of the polytetrafluorethylene sold under the trademark TEFLON.

Preferably, the truncated cone wings are three in number and placed at 120° with respect to one another on its inner surface. Preferably also, each wing extends perpendicularly to the truncated cone inner surface and has a profile which is developped as a broken line, notably into three successive portions, inclined with respect to the direction of the truncated cone axis.

In a manner which is more interesting because it is more efficient, the wings are respectively inclined with respect to the horizontal by an angle which is equal for the two extreme portions of each wing and by a more acute angle for the intermediate portion. Thus and in a preferred embodiment of the invention, the angle formed by the extreme portions of each wing is close to 40°, the angle of the intermediate portion being of the order of 60°.

Advantageously and according still to another feature of the device according to the invention, the portion of each wing which is closer to the inlet upper end of the truncated cone has a bevelled outer contour, inclined from the edge of the wing toward to the truncated cone inner surface.

In an embodiment of the instant device, the truncated cone axis is inclined with respect to the horizontal plane so as to form an angle between 5° and 10° and preferably equal to 7° with this plane. Preferably however, the angle formed by the truncated cone axis and the horizontal plane can be settable as a function of the flow rate of parcels to be treated and of their speed of travel.

The driving mechanism of the truncated cone about its axis can be made in any appropriate way, known per se in fields possibly distinct from that of the present invention. Thus and according to a particular embodiment, the truncated cone bears on driving rollers, controlled in rotation in a reverse direction to that of the truncated cone, one of the rollers at least including a grooved pulley or a pinion for driving the roller and, by reaction, the truncated cone, from a movement return device provided by a variable speed reduction gear unit, controlled as required.

The invention relates also to a parcel sorting installation, using the device in consideration such as defined hereabove, characterized in that it includes at least two successive truncated cones, driven at different speeds, the first providing for a beginning of alignment of the parcels and the second improving the alignment and the separation of said parcels, the speed of rotation of the first truncated cone being less than the speed of the second truncated cone. Advantageously, the connection between the outlet of the first truncated cone and the inlet of the second truncated cone is provided by at least a conveyor belt or a feeding band, with a linear speed possibly variable, the parcels being respectively brought at the inlet upper portion of the first truncated cone and finally discharged at the lower outlet portion of the second truncated cone by other similar conveyor bands or belts.

Preferably the linear speeds of the parcels when passing through the truncated cones, and those of the conveyor belts, have successive values increasing from one end of the installation to the other, in the direction of travel of the parcels.

Other features of a device for the separation and alignment of objects in bulk, notably of packages, parcels or similar objects, and of a sorting installation using the device, will become more apparent from the following description of an embodiment, given by way of indication and non limiting, with reference to the accompanying drawings wherein.

Figure 1:
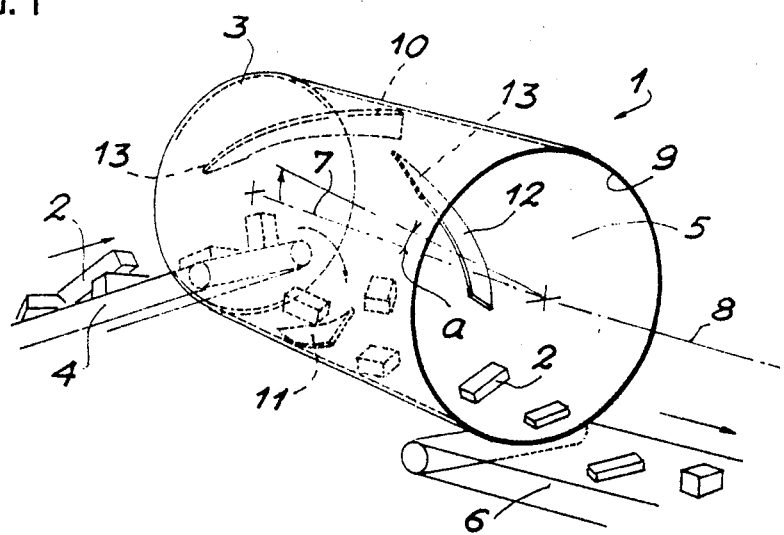
FIG. 1 is a perspective schematic view of the device in consideration.

In FIG. 1 is shown under reference numeral 1 a truncated cone opened at its ends, for providing the separation and sorting of various packages or parcels such as 2, brought in large quantities and according to an appreciable flow rate, in bulk, at the upper inlet 3 of the truncated cone by means of a first conveyor belt 4, conveniently inclined upwardly and the end of which opens in or in the immediate vicinity of the upper portion of this truncated cone. The parcels 2, already separated and substantially in alignment, are taken over at the outlet 5, in the lower portion of truncated cone 1, by a second conveyor belt 6, generally horizontal.

According to the invention, truncated cone 1 is placed in such manner that its axis of revolution 7 forms with the direction of the horizontal 8 and angle a having a value between 5° and 10° and preferably equal to 7°, the truncated cone being supported by means (not shown) allowing, if need be, varying angle a and therefore the speed by which parcels 2 travel through the truncated cone. Truncated cone 1 rotates over itself and includes in its inner surface 9 three helical wings, respectively 10, 11 and 12, axially offset with respect to one another, and arranged in such manner that they extend when taken together over at least one complete turn of the truncated cone.

Figure 3:
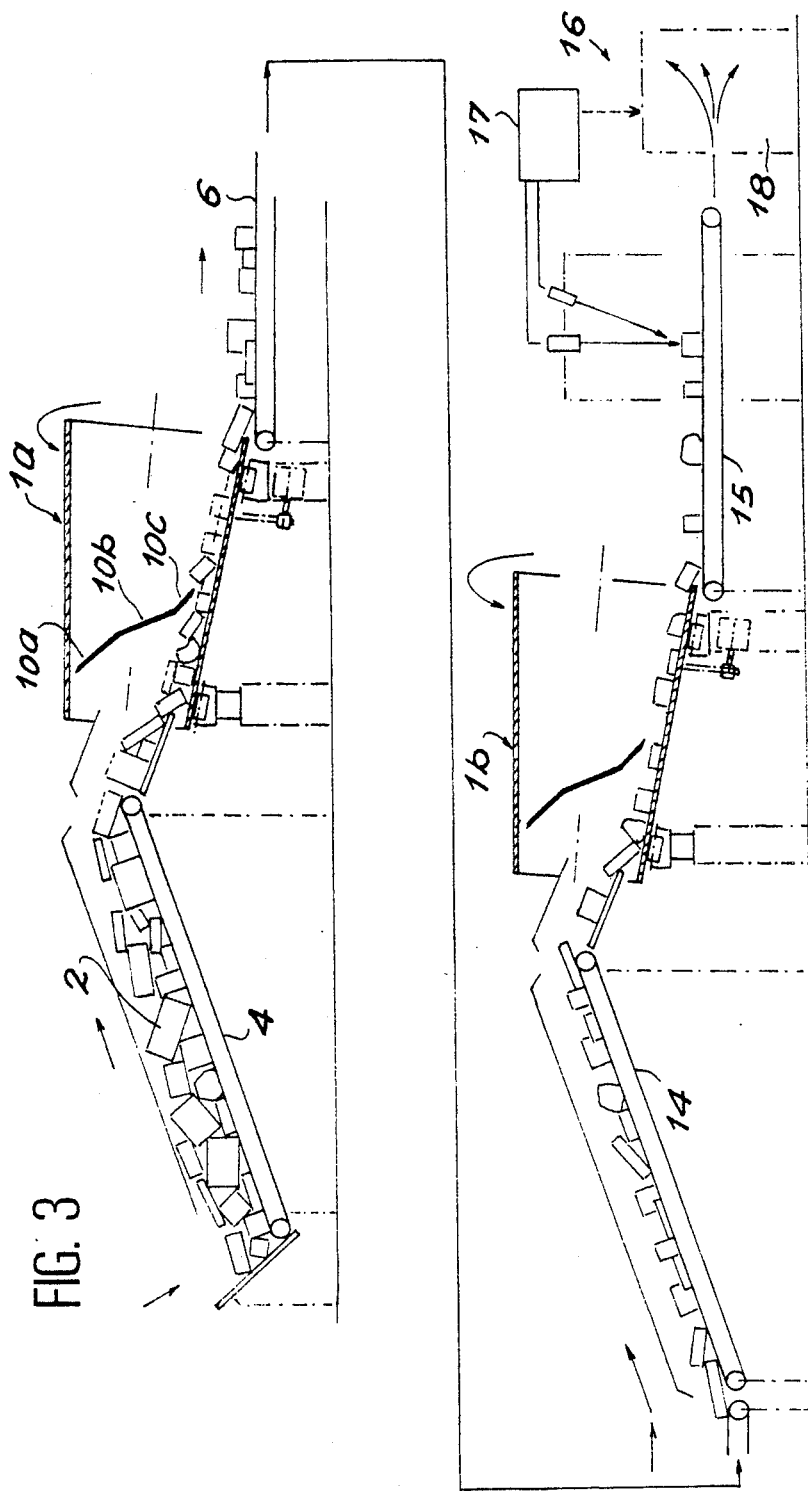
FIG. 3 is also a very schematic view in longitudinal section of a sorting installation using two truncated cones and various conveyor belts or bands, according to the invention.

Preferably, the over-mentioned wings extend over a third of the cone circumference, are disposed at 120° from one another with respect to axis 7. Each wing 10, 11, 12 is implanted perpendicularly to the inner surface 9, and as may be seen more clearly in FIGS. 3 and 4, has a profile developed in the shape of a broken line, wing 10 for example including three successive portions, respectively 10a, 10b and 10c (FIG. 3). The end portions have notably the same inclination with respect to the direction of axis 7, while the intermediate portion 10b forms an angle which is substantially larger. In the example shown, the angle of portions 10a and 10c is chosen preferably equal or close to 40°, the angle of portion 10b being of about 60°. Moreover, each wing 10, 11 or 12 has at its end which is closer to inlet 3 of the truncated cone a slanting portion 13 forming a bevel and extending from the edge of the wing to the inner surface 9 of the truncated cone.

Figure 2:
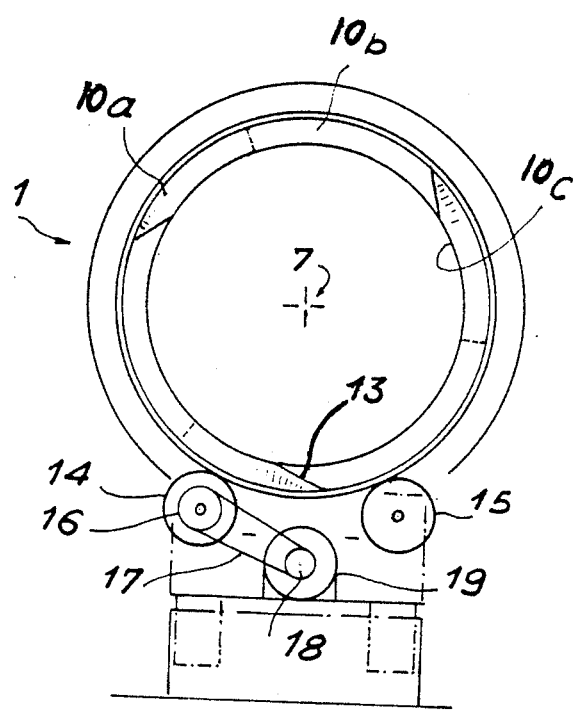
FIG. 2 is a transverse sectional view of the device, showing notably the means used for driving the truncated cone about its axis.

In FIG. 2 is shown schematically a driving mechanism for rotating truncated cone 1 over itself, including particularly two rollers 14 and 15 on which it bears, one of these rollers, for example roller 14, being provided with a pulley 16 allowing transmitting to this roller, by means of a transmission belt 17, the driving motion received from another pulley 18 fixed at the end of an outlet shaft of a variable speed reduction gear unit 19. Of course, it is obvious that this mechanism is standard as such and that it could be substituted by any other similar or equivalent means (toothed wheel meshing with a control pinion, tangent screw system, etc...) fulfilling the same function and providing notably for the driving at a chosen speed of the truncated cone about its axis.

In FIG. 3, the treatment installation of packages or parcels shown includes two successive truncated cones 1a and 1b, similar to that shown in FIG. 1, parcels 2 brought to the inlet of the first truncated cone 1a by belt 4 and discharged at the outlet of this truncated cone by belt 6 in the manner hereabove described, being subjected when travelling through this truncated cone to a first alignment action, while that the final separation and alignment are improved by their passage through the second truncated cone 1b. The parcels 2, when exiting from belt 6, are thus taken over by a new elevating conveyor belt 14, which discharges them at the inlet of the second truncated cone 1b prior to their being taken away, being then conveniently separated and aligned, by a final conveyor belt 15 which brings them finally to a sorting installation 16 including a reading member 17 of a code carried by these parcels and, possibly, a switching device 18 acting on the distribution of the parcels according to the directions predetermined as a function of the codes thus detected and registered.

In a particular embodiment of the installation in consideration, the two truncated cones 1a and 1b have a length of 2 meters, with a small diameter at their upper end of the order of 1 meter and a larger diameter at their lower end of 1.25 meter. The inclination of the axis with respect to the horizontal is chosen equal to about 7°, the rotation speed being variable for one and the other of these truncated cones and between 5 and 25 r/min according to the flow rates of the parcels to be treated. The three wings mounted in the manner indicated inside each truncated cone has each a height of about 100 millimeters and a length of about 900 millimeters when projected on a horizontal plane.

The relative speeds of the two truncated cones of the installation as well as those of the various conveyor belts 4, 6, 14 and 15 are chosen as a function of the characteristics of the parcels to be treated, particulary of the average length and of the flow rate with which these parcels have to be carried to the outlet of the installation for their final distribution toward the directions corresponding to the codes carried by these parcels.

Thus, assuming for example that ten successive packages or parcels placed end to end represent an approximative distance of three meters, each parcel being about thirty centimeters long, experience shows that it is necessary to set respectively the linear speed of the band or belt bringing these parcels at the inlet of the first truncated cone and the travelling speed of these same parcels in the latter with a ratio substantially equal to that measuring the number of these parcels per meter. In other words and in the example in consideration, the average distribution being of three parcels per meter about, and if the travelling speed of the parcels in the truncated cone is equal to 10 m/min, a linear speed of about 3,33 m/min will be set for the feeding belt. In a usefull manner, the difference between these two speeds will be increased by setting either the speed inside the truncated cone to 12 m/min, or the speed of the belt to 3 m/min.

In all cases, a good operation of the installation requires that, in the various portions of the latter, the outlet flow rate of the parcels be always in excess to or at least equal to the inlet flow rate in the following portion.

Thus, with a set of packages or parcels discharged in bulk from a container of 500 liters about on the first belt 4, representing from about 80 to 100 parcels, a linear speed of 3 m/min will be imparted for example to the belt, with an inclination to the horizontal of 20° to 25°, the first truncated cone 1a being driven in rotation over itself at a speed such that the travelling speed of the parcels in the latter be equal to 12 m/min about. The parcels thus discharged at the upper end 3 and driven to the bottom of the truncated cone due the combined effects of gravity and rotation are then lifted by the successive wings, which accelerate these parcels while offsetting and finally separating them, while at the same time and due to the rotation of the truncated cone they slide permanently on the inner surface of the truncated cone in order to dispose themselves one by one approximately along the lower generating line of the truncated cone. In order to facilitate precisely this sliding motion of the parcels and their continuous return toward this generating line each time they are lifted by a wing of the truncated cone, notwithstanding the driving effect due to the rotation, the inner surface 9 is coated with a layer of a material having a very low coeffiecient of friction, for example polytetrafluorethylene sold under the trademark TEFLON.

The function of the bevel is to forward a parcel which could not be conveniently entrained.

The parcels 2 which are thus more or less separated and in alignment but still insufficiently offset, and exiting from the first truncated cone 1a via its lower end 5, are then taken over in the position they assume by conveyor belt 6, then by elevator belt 14 bringing them progressively but at a greater speed to the inlet of the second truncated cone 1b. In the example in consideration, the linear speeds of band 6 and belt 14 are chosen equal, of the order to 15 m/min, and therefore slightly more than the linear speed of these parcels at the outlet of the first truncated cone 1a (10 m/min), so as to produce as they are taken over on the belt a new alignment of the flux of parcels. These parcels are then subjected to a final separation in the second truncated cone 1b according to a process exactly similar to that used in the first truncated cone, with an acceleration of the parcels by the wings and a continuous sliding motion from top to bottom of the truncated cone, the linear speed of the parcels being then close to 18 m/min. Finally, at the outlet of the truncated cone, the parcels are finally taken over by belt 15 the speed of which is chosen so as to be slightly superior to that of the parcels in truncated cone 1b, for example of the order of 20 to 25 m/min.

Thus is provided a device and an installation for the separation and alignment of packages or similar parcels which is reliable and efficient, allowing a correct reading of the codes or other identification means carried by these parcels, which reaches at least 95%. The handling operations of the parcels are without danger for these parcels due to the enveloping shape of the wings which lift them and progressively offset them without hindering their sliding movement in the truncated cones along the lower generating line of the latter. When used for different cases, the operation parameters of the installation can be set according to the flow rate to be treated, the size of the parcels, the moving speed of these parcels, etc. It should be noted in this respect that the values of these speeds, considered in the example shown, have of course only an indicative character and could be easily adapted according to these parameters, whereby the different portions of the installation, particularly the truncated cones and the conveyor bands and belts, could be controlled independently by distinct driving mechanisms, provided with appropriate speed variators.

I claim:

1. A device for the separation and alignment of objects of the packages, parcels or similar kind, including conveyor means for the parcels brought in bulk to the inlet and for discharging the same parcels separated and aligned at the outlet, characterized in that it includes at least one truncated cone opened at its ends, driven continuously in rotation about its axis which is inclined with respect to the horizontal and which includes in its inner surface a set of helical wings, axially offset with respect to one another and extending when taken together over at least one complete turn of the truncated cone, the parcels introduced at the upper end of smaller diameter at the inlet of the truncated cone being discharged at its lower end of larger diameter at its outlet.

2. A device according to claim 1, characterised in that the inner surface of the truncated cone includes a coating with a very low coefficient of friction.

3. A device according to claim 1 or 2, characterized in that the truncated cone wings are three in number and placed at 120° with respect to one another on its inner surface.

4. A device according to claim 3, characterized in that each wing extends perpendicularly to the truncated cone inner surface and has a profile which is developed as a broken line, notably into three successive portions, inclined with respect to the direction of the truncated cone axis.

5. A device according to claim 4, characterized in that the wings are respectively inclined with respect to the horizontal by an angle equal for the two extreme portions of each wing and by a more acute angle for the intermediate portion.

6. A device according to claim 5, characterized in that the angle formed by the extreme portions of each wing is close to 40°, the angle of the intermediate portion being of the order of 60°.

7. A device according to claim 3, characterized in that the portion of each wing which is closer to the inlet upper end of the truncated cone has a bevelled outer contour, inclined from the edge of the wing toward to the truncated cone inner surface.

8. A device according to claim 1, characterized in that the truncated cone axis is inclined with respect to the horizontal plane so as to form an angle between 5° and 10° and preferably equal to 7° with this plane.

9. A device according to claim 8, characterized in that the angle formed by the truncated cone axis and the horizontal plane can be settable as a function of the flow rate of parcels to be treated and of their speed of travel.

10. A device according to claim 1, characterized in that the truncated cone bears on driving rollers, controlled in rotation in a reverse direction to that of the truncated cone, one of the rollers at least including a grooved pulley or a pinion for driving the roller and, by reaction, the truncated cone, from a movement return device provided by a variable speed reduction gear unit, controlled as required.

11. A device according to claim 10, characterized in that the driving speed of the truncated cone is between 5 and 25 r/min.

12. A parcel sorting installation using a device according to claim 1, characterized in that it includes at least two successive truncated cones, driven at different speeds, the first providing for a beginning of alignment of the parcels and the second improving the alignment and the separation of said parcels, the speed of rotation of the first truncated cone being less than the speed of the second truncated cone.

13. An installation according to claim 12, characterized in that the connection between the outlet of the first truncated cone and the inlet of the second truncated cone is provided by at least a conveyor belt or a feeding band, with a linear speed possibly varialble, the parcels being respectively brought at the inlet upper portion of the first truncated cone and finally discharged at the lower outlet portion of the second truncated cone by other similar conveyor bands or belts.

14. An installation according to claim 13, characterized in that the linear speeds of the parcels when passing through the truncated cones, and those of the conveyor belts, have successive values increasing from one end of the installation to the other, in the direction of travel of the parcels.

* * * * *

UNITED STATES PATENT AND TRADEMARK OFFICE
CERTIFICATE OF CORRECTION

PATENT NO. : 4,984,678
DATED : January 15, 1991
INVENTOR(S) : Pierre Fauchard It is certified that error appears in the above-identified patent and that said Letters Patent is hereby corrected as shown below:

In the Abstract, line 1, delete "objects of the";
line 2, change "similar kind" to --the like,--;
line 11, change ", the parcels" to --. The parcels are--;
line 12, after "upper" insert --cone-- and delete "at the inlet of the";
line 13, change "truncated cone being" to --and are-- and delete "at";
line 14, delete "its outlet".

Column 1, line 5, after title of invention insert and center the heading --FIELD OF THE INVENTION--;

Column 1, line 8, delete "of";
line 10, change "a ulterior" to --subsequent--;
Between lines 10 and 11, insert and center the heading --BACKGROUND OF THE INVENTION--;

UNITED STATES PATENT AND TRADEMARK OFFICE
CERTIFICATE OF CORRECTION

PATENT NO. : 4,984,678

DATED : January 15, 1991

INVENTOR(S) : Pierre Fauchard

It is certified that error appears in the above-identified patent and that said Letters Patent is hereby corrected as shown below:

line 20, change "ulterior" to--subsequent--;

line 22, change "require" to--requires--;

line 26, after "according" insert--to--;

line 48 change "the whole of" to--all the--;

line 53, after "in" insert--European--;

line 55, change "little" to--ill--;

Between lines 57 and 58, insert and center the heading-- line 58, change "allowing" to--which allows--;

line 60, after "manufacture," insert--is--; change "having" to--has--;

line 62, after "all" insert--is--.

Column 2, line 7, delete "at the inlet of the truncated cone being";

line 8, delete "at its outlet";

line 16, between "and placed" insert--are--;

line 19, change "developped" to--developed--;

UNITED STATES PATENT AND TRADEMARK OFFICE
CERTIFICATE OF CORRECTION

PATENT NO. : 4,984,678          Page 3 of 8
DATED : January 15, 1991
INVENTOR(S) : Pierre Fauchard It is certified that error appears in the above-identified patent and that said Letters Patent is hereby corrected as shown below:

line 31, change "Advantageously and according still to another" to --Another advantageous--;

line 32, after invention, insert --is that--;

line 35, delete --to--;

line 50, after "cone," insert --at least-- and delete "at least".

Column 3, Between lines 15 and 16 insert and center the heading --BRIEF DESCRIPTIONS OF THE FIGURES--;

Between lines 24 and 25 insert and center the heading --DETAILED DESCRIPTION OF THE PRESENT INVENTION--;

line 25, after "FIG. 1" insert --there--;

line 38, delete "forms";

line 39, delete "with the direction of the" and insert --and--; after "horizontal 8" change "and" to --form--;

line 48, change "over" to --above--;

line 64, delete "of";

Column 4, line 1, after "FIG. 2" insert --there--;

line 2, delete "over itself";

UNITED STATES PATENT AND TRADEMARK OFFICE
CERTIFICATE OF CORRECTION

PATENT NO. : 4,984,678
DATED : January 15, 1991
INVENTOR(S) : Pierre Fauchard It is certified that error appears in the above-identified patent and that said Letters Patent is hereby corrected as shown below:

line 3, delete "particularly"; and change "on which it bears" to --which bear the cone--;

line 5, after "pulley" insert --wheel--; change "transmitting" to --transmission--;

line 7, after "pulley" insert --wheel--;

line 13, change "notably" to --chiefly--; delete "the" (second occurrence);

line 14, delete "at a chosen speed of";

line 15, after "axis" insert --at a chosen speed--;

line 18, change "FIG. 1, parcels 2" to --FIG. 1. Parcels 2,--;

line 21, change "being" to --are--;

line 23, change "that the" to --their--;

line 27, change "14" to --14'--;

line 29, change "away, being then" to --away. They are then--;

line 30, change "15" to --15'--;

line 31, change "16" to --16'--;

line 32, change "17" to --17'--;

line 33, change "18" to --18'--;

UNITED STATES PATENT AND TRADEMARK OFFICE
CERTIFICATE OF CORRECTION

PATENT NO. : 4,984,678

DATED : January 15, 1991

INVENTOR(S) : Pierre Fauchard

It is certified that error appears in the above-identified patent and that said Letters Patent is hereby corrected as shown below:

line 40, change "meter" to--meters--;

line 41, after "chosen" insert--to be--;

line 43, after "and" insert--ranging--;

line 45, change "The" (first occurrence) to--Each of the--;

line 46, delete "each" (second occurrence);

line 51, change "14" to--14'--; and change "15" to--15'--;

line 62, delete "respectively";

line 67, change "and in" to--for--; and change "in" to--under--;

line 68, change "of" to--about--;

Column 5, line 1, delete "about";

line 3, change "3,33" to--3.33--;

line 4, change "usefull" to--useful--;

line 10, change "to" to--of--;

line 14, after "of" insert--about--; after "liters" delete--about--;

line 18, delete "driven in rotation over";

line 19, change "itself" to--rotated-- line 20, delete "in the latter"; change "be" to--is--; after "to" insert--about--;

UNITED STATES PATENT AND TRADEMARK OFFICE
CERTIFICATE OF CORRECTION

PATENT NO. : 4,984,678
DATED : January 15, 1991
INVENTOR(S) : Pierre Fauchard It is certified that error appears in the above-identified patent and that said Letters Patent is hereby corrected as shown below:

```
        line 21, change "end" to--inlet--;
        line 22, after "due" insert--to--;
        lines 28 and 29, delete "approximately";
        line 30, delete "precisely";
        line 42, after "lower" insert--outlet--;
        line 44, change "14" to--14'--;
        line 46, change "in" (second occurrence) to--under--;
        line 47, change "band" to--belt--; change "14" to--
                 14'--; after "chosen" add--to be--;
        line 48, change "of" to--on--; change "to" to--of--;
                 change "15" to--15'--;
        line 52, change "of" (first occurrence) to--on--;
        line 68, change "for" to--to--.
Column 6, line 4,  delete "of the latter";
        line 16, change "variators" to--controllers.
```

Column 6, lines 1-14

Claim 1. (Amended) A device for the separation and alignment of [objects of the] packages, parcels or similar [kind] objects, including conveyor means for the parcels brought in bulk to

UNITED STATES PATENT AND TRADEMARK OFFICE
CERTIFICATE OF CORRECTION

PATENT NO. : 4,984,678
DATED : January 15, 1991
INVENTOR(S) : Pierre Fauchard It is certified that error appears in the above-identified patent and that said Letters Patent is hereby corrected as shown below:

[the] <u>an</u> inlet and for discharging the same parcels separated and aligned at [the] <u>an</u> outlet, [characterized in that it includes] <u>comprising</u>: at least one truncated cone opened at its ends, driven continuously in rotation about its axis which is inclined with respect to the horizontal and which includes [in] <u>on</u> its inner surface a set of helical wings, axially offset with respect to one another and extending when taken together over at least one complete turn of the truncated cone, the parcels <u>being</u> introduced at [the] <u>an</u> upper <u>inlet</u> end of smaller diameter [at the inlet] of the truncated cone [being] <u>and</u> discharged at its lower <u>outlet</u> end of larger diameter [at its outlet].

UNITED STATES PATENT AND TRADEMARK OFFICE
CERTIFICATE OF CORRECTION

PATENT NO. : 4,984,678
DATED : January 15, 1991
INVENTOR(S) : Pierre Fauchard

It is certified that error appears in the above-indentified patent and that said Letters Patent is hereby corrected as shown below:

Column 6, line 1, claim 2, change "characterised" to --characterized --;

Column 6, line 3, claim 5, change "for" to --to --;

Column 6, line 3, claim 7, delete "to".

Signed and Sealed this

Sixteenth Day of August, 1994

Attest:

BRUCE LEHMAN

Attesting Officer          Commissioner of Patents and Trademarks